United States Patent
Andersson et al.

(10) Patent No.: US 10,547,838 B2
(45) Date of Patent: Jan. 28, 2020

(54) ENCODING AND DECODING A VIDEO FRAME IN SEPARATE PROCESSING UNITS

(71) Applicant: Telefonaktiebolaget LM Ericsson (publ), Stockholm (SE)

(72) Inventors: Kenneth Andersson, Gävle (SE); Jack Enhorn, Kista (SE); Julien Michot, Sundbyberg (SE); Thomas Rusert, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 148 days.

(21) Appl. No.: 15/511,721

(22) PCT Filed: Sep. 30, 2014

(86) PCT No.: PCT/SE2014/051138
§ 371 (c)(1),
(2) Date: Mar. 16, 2017

(87) PCT Pub. No.: WO2016/053154
PCT Pub. Date: Apr. 7, 2016

(65) Prior Publication Data
US 2017/0251209 A1   Aug. 31, 2017

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/174* (2014.11); *H04N 19/176* (2014.11); *H04N 19/436* (2014.11)

(58) Field of Classification Search
None
See application file for complete search history.

(56) References Cited

U.S. PATENT DOCUMENTS 8,223,845 B1* 7/2012 Duvivier ............... H04N 19/80
375/240.24
2004/0125111 A1* 7/2004 Tang-Petersen ...... G06T 15/005
345/506
(Continued)

FOREIGN PATENT DOCUMENTS

CN        101107863 A       1/2008
WO        2008024345 A1     8/2007
(Continued)

*Primary Examiner* — Michael J Hess
(74) *Attorney, Agent, or Firm* — Coats & Bennett, PLLC

(57) ABSTRACT

It is presented a method for encoding a video frame of a piece of video content. The method is performed in an encoder device and comprises the steps of: dividing the video frame into a set of non-overlapping regions, wherein the set comprises at least one region; assigning each region, in the set of regions, to a separate processing unit; encoding, in each processing unit, picture data of the respective region; collecting progress data from each processing unit, the progress data indicating progress of the encoding of the respective region; and dividing a particular region into a plurality of smaller regions and assigning each smaller region to a separate processing unit, when the progress data indicates that progress of encoding the particular region is insufficient.

26 Claims, 6 Drawing Sheets

(51) Int. Cl.
*H04N 19/174* (2014.01)
*H04N 19/436* (2014.01)

(56) References Cited

U.S. PATENT DOCUMENTS

| | | |
|---|---|---|
| 2008/0137736 A1 | 7/2008 | Richardson et al. |
| 2008/0219349 A1 | 9/2008 | Huang et al. |
| 2008/0225950 A1 | 9/2008 | Zhu et al. |
| 2011/0161637 A1* | 6/2011 | Sihn ................ G06F 9/5066 |
| | | 712/220 |
| 2012/0027314 A1 | 2/2012 | Lee et al. |
| 2013/0039593 A1* | 2/2013 | Komiya ............. H04N 19/46 |
| | | 382/233 |
| 2013/0202051 A1* | 8/2013 | Zhou ............... H04N 19/436 |
| | | 375/240.26 |
| 2014/0010282 A1* | 1/2014 | He .................. H04N 21/23439 |
| | | 375/240.02 |
| 2014/0153644 A1* | 6/2014 | Dzik ................ H04N 19/119 |
| | | 375/240.12 |
| 2014/0176737 A1* | 6/2014 | Ikeda ............... H04N 5/23267 |
| | | 348/208.1 |
| 2015/0181218 A1* | 6/2015 | Okawa .............. H04N 19/513 |
| | | 375/240.16 |
| 2017/0013269 A1* | 1/2017 | Kim ................. H04N 19/436 |

FOREIGN PATENT DOCUMENTS

| | | |
|---|---|---|
| WO | 2008079041 A1 | 7/2008 |
| WO | 2010143226 A1 | 12/2010 |
| WO | 2012095801 A1 | 1/2012 |

\* cited by examiner

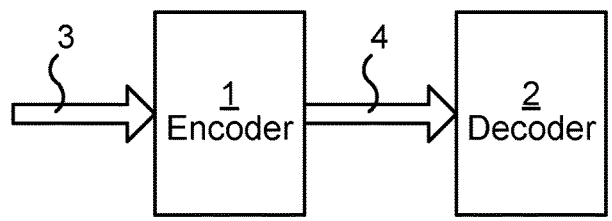
Fig. 1
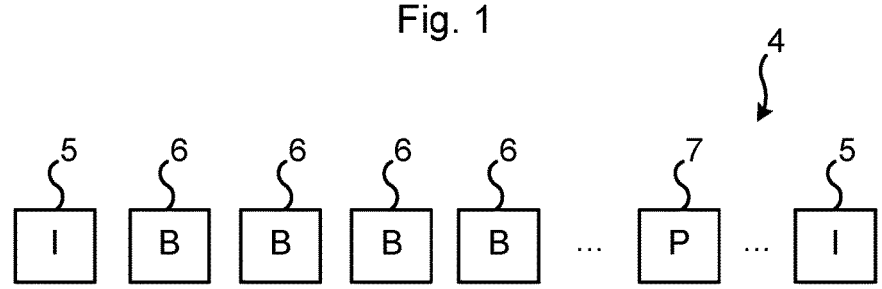
Fig. 2
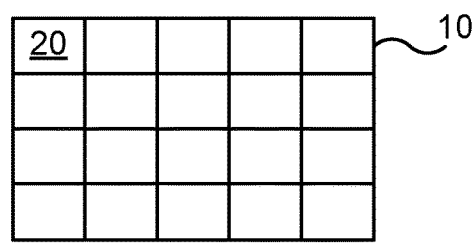
Fig. 3
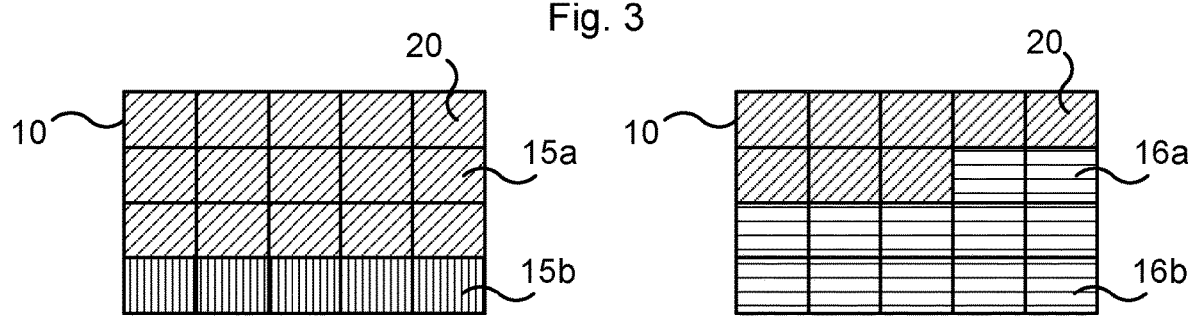
Fig. 4
Fig. 5

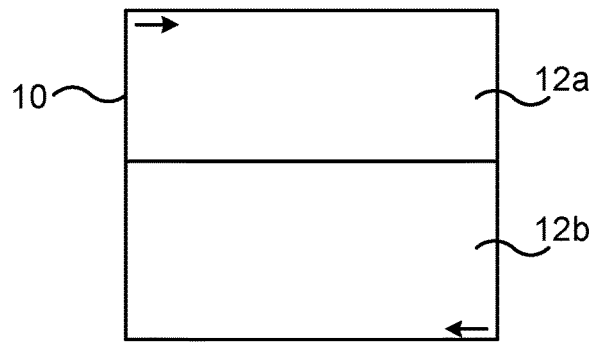
Fig. 6
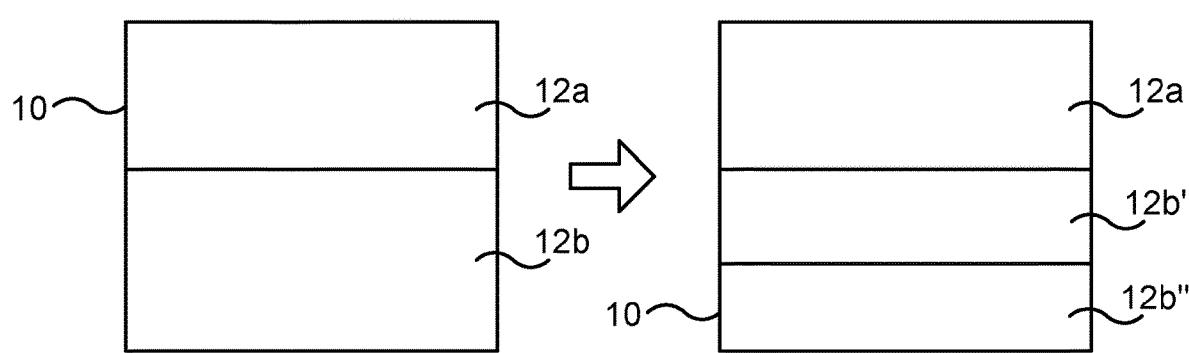
Fig. 7A                    Fig. 7B
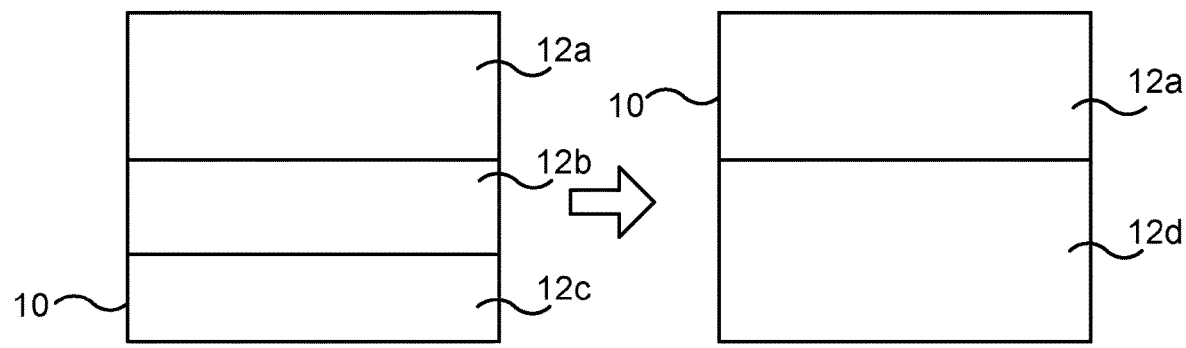
Fig. 8A                    Fig. 8B

ENCODING AND DECODING A VIDEO FRAME IN SEPARATE PROCESSING UNITS

TECHNICAL FIELD

The invention relates to an encoder device, a decoder device, methods, computer programs and computer program products for encoding and decoding a video frame.

BACKGROUND

In video coding standards such as H.263, H.264, and HEVC (High Efficiency Video Coding) video frames can be divided into partitions which can be encoded or decoded in separate processing units (e.g. processor cores). This improves parallelism and error resilience.

In one way, increased parallelism is beneficial since the total duration for encoding or decoding a frame is reduced. However, increased parallelism is also disadvantageous. In encoding, the use of more separate regions reduces coding efficiency since similarities between regions can be utilized to a lower degree. In decoding (and to some degree also in encoding), using more processing units increases power usage, which can be particularly problematic for mobile devices where increased power usage implies shorter battery life.

In WO 2012/095801 it is disclosed that in video encoding it is common to encode the image data to remove redundancies in the information to be transmitted. While the pixel data is usually arranged in pixel blocks, the blocks can be arranged in one or more groups of N×M blocks called tiles. The tiles avoid the need to send header information on a tile-by-tile or block-by-block basis, and simplifies parallel processing of the tiles. Bits from respective tiles may then be reformatted to recreate bits according to a raster-scan direction. This enables the decoder to receive the bits in a regular raster-scan format, but also have the ability to decode the tiles once the bits are reformatted. By partitioning an image into tiles of size N×M, it is possible to further exploit the intra-frame correspondence of images in a vertical direction as well as horizontal direction since the tiles need not destroy as many dependencies between blocks in a tile as if the blocks were organized in slices or slice groups. In encoding, the arrangement of tiles is disclosed to correspond to the number of available cores. However, such an arrangement may not be optimal since this can reduce encoding efficiency on the encoder side and power efficiency on the decoder side.

SUMMARY

It is an object to provide a way in which parallelism is used with finer control based on progress.

According to a first aspect, it is provided a method for encoding a video frame of a piece of video content. The method is performed in an encoder device and comprises the steps of: dividing the video frame into a set of non-overlapping regions, wherein the set comprises at least one region; assigning each region, in the set of regions, to a separate processing unit; encoding, in each processing unit, picture data of the respective region; collecting progress data from each processing unit, the progress data indicating progress of the encoding of the respective region; and dividing a particular region into a plurality of smaller regions and assigning each smaller region to a separate processing unit, when the progress data indicates that progress of encoding the particular region is insufficient.

Using these methods, a dynamic, adaptive parallelism for encoding is achieved. This allows increased parallelism with more regions to be used only when needed, thereby, when possible, avoiding the disadvantages of parallelism, such as reduced encoding efficiency.

In the step of dividing a particular region, insufficient progress may be when the progress data indicates that the encoding will not be finished by a specific time.

The method may further comprise the step of: combining a plurality of regions in a combined region and assigning the combined region to a specific processing unit, being one of the processing units associated with the plurality of regions, when the progress data indicates that the specific processing unit has spare capacity.

In the step of combining, spare capacity may be when the progress data for the combined processing unit indicates that it is capable of encoding the combined region by a specific time.

The method may further comprise the step of: assigning an encoding direction for each processing unit, the encoding direction being either starting from the beginning or starting from the end.

In the step of dividing the video frame, each region may be a rectangular tile of pixel blocks, wherein each pixel block is a square of pixels.

In the step of dividing the video frame, each region may be a slice of consecutive pixel blocks, wherein each pixel block is a square of pixels.

The method may further comprise the step of: calculating the specific time by deducting a margin time from a deadline time.

The method may further comprise the step of: adding supplementary enhancement information in association with the video frame, the supplementary enhancement information comprising decoding complexity data for each region of the video frame.

The step of dividing the video frame may comprise obtaining information regarding how a preceding video frame of the same frame type of the piece of video content was finally divided and dividing the video frame in the same way.

According to a second aspect, it is provided an encoder device for encoding a video frame of a piece of video content. The encoder device comprises: a processor; and a memory storing instructions that, when executed by the processor, causes the encoding device to: divide the video frame into a set of non-overlapping regions, wherein the set comprises at least one region; assign each region, in the set of regions, to a separate processing unit; encode, in each processing unit, picture data of the respective region; collect progress data from each processing unit, the progress data indicating progress of the encoding of the respective region; and divide a particular region into a plurality of smaller regions and assigning each smaller region to a separate processing unit, when the progress data indicates that progress of encoding the particular region is insufficient.

The encoder device may further comprise instructions that, when executed by the processor, causes the encoding device to combine a plurality of regions in a combined region and assigning the combined region to a specific processing unit, being one of the processing units associated with the plurality of regions, when the progress data indicates that the specific processing unit has spare capacity.

The encoder device may be further comprising instructions that, when executed by the processor, causes the encoding device to assign an encoding direction for each processing unit, the encoding direction being either starting from the beginning or starting from the end.

The encoder device may further comprise the encoding instructions that, when executed by the processor, causes the encoding device to add supplementary enhancement information in association with the video frame, the supplementary enhancement information comprising decoding complexity data for each region of the video frame.

The instructions to divide the video frame may comprise instructions that, when executed by the processor, causes the encoding device to obtain information regarding how a preceding video frame of the same frame type of the piece of video content was finally divided and divide the video frame in the same way.

Each processing unit may be a processor core.

According to a third aspect, it is provided an encoder device comprising: means for dividing a video frame of a piece of video content into a set of non-overlapping regions, wherein the set comprises at least one region; means for assigning each region, in the set of regions, to a separate processing unit; means for encoding, in each processing unit, picture data of the respective region; means for collecting progress data from each processing unit, the progress data indicating progress of the encoding of the respective region; and means for dividing a particular region into a plurality of smaller regions and assigning each smaller region to a separate processing unit, when the progress data indicates that progress of encoding the particular region is insufficient.

According to a fourth aspect, it is provided a computer program for encoding a video frame of a piece of video content. The computer program comprises computer program code which, when run on an encoding device causes the encoding device to: divide the video frame into a set of non-overlapping regions comprising at least one region; assign each region, in the set of regions, to a separate processing unit; encode, in each processing unit, picture data of the respective region; collect progress data from each processing unit, the progress data indicating progress of the encoding of the respective region; and divide a particular region into a plurality of smaller regions and assigning each smaller region to a separate processing unit, when the progress data indicates that progress of encoding the particular region is insufficient.

According to a fifth aspect, it is provided a computer program product comprising a computer program according to the fourth aspect and a computer readable means on which the computer program is stored.

According to a sixth aspect, it is provided a method for decoding a video frame of a piece of video content. The method being performed in a decoder device and comprising the steps of: determining a set of non-overlapping regions of the video frame by reading metadata associated with the video frame; assigning each region, in the set of regions, to a processing unit, wherein at least one processing unit is assigned a plurality of regions;

decoding, in each processing unit, picture data of its assigned region or regions; collecting progress data from each processing unit, the progress data indicating progress of the decoding; and reassigning a particular region for which decoding has not begun to another processing unit when the progress data, for the processing unit originally assigned the particular region, indicates that progress of decoding its assigned regions is insufficient.

In the step of reassigning a particular region, insufficient progress may be when the progress data indicates that the decoding will not be finished by a specific time.

The method may further comprise the step of: calculating the specific time by deducting a margin time from a deadline time.

The method may further comprise the step of: reading supplementary enhancement information in association with the video frame, the supplementary enhancement information comprising decoding complexity data for each region of the video frame. In such a case, the step of assigning each region comprises assigning each region based on the supplementary enhancement information.

In the step of determining a set of non-overlapping regions, each region may be a rectangular tile of pixel blocks, wherein each pixel block is a square of pixels.

In the step of determining a set of non-overlapping regions, each region may be a slice of consecutive pixel blocks, wherein each pixel block is a square of pixels.

The step of assigning each region may comprise obtaining information regarding how a preceding video frame of the same frame type of the piece of video content was finally assigned and assigning the video frame in the same way.

According to a seventh aspect, it is provided a decoder device for decoding a video frame of a piece of video content. The decoder device comprises: a processor; and a memory storing instructions that, when executed by the processor, causes the decoder device to: determine a set of non-overlapping regions of the video frame by reading metadata associated with the video frame; assign each region, in the set of regions, to a processing unit, wherein at least one processing unit is assigned a plurality of regions; decode, in each processing unit, picture data of its assigned region or regions; collect progress data from each processing unit, the progress data indicating progress of the decoding; and reassign a particular region for which decoding has not begun to another processing unit when the progress data, for the processing unit originally assigned the particular region, indicates that progress of decoding its assigned regions is insufficient.

The decoder device may further comprise instructions that, when executed by the processor, causes the decoding device to read supplementary enhancement information in association with the video frame, the supplementary enhancement information comprising decoding complexity data for each region of the video frame; and wherein the instructions to assign each region comprise instructions that, when executed by the processor, causes the decoding device to assign each region based on the supplementary enhancement information.

The instructions to assign each region may comprise instructions that, when executed by the processor, causes the decoding device to obtain information regarding how a preceding video frame of the same frame type of the piece of video content was finally assigned and assigning the video frame in the same way.

According to an eighth aspect, it is provided a decoder device comprising: means for determining a set of non-overlapping regions of a video frame of a piece of video content by reading metadata associated with the video frame; means for assigning each region, in the set of regions, to a processing unit, wherein at least one processing unit is assigned a plurality of regions; means for decoding, in each processing unit, picture data of its assigned region or regions; means for collecting progress data from each processing unit, the progress data indicating progress of the decoding; and means for reassigning a particular region for which decoding has not begun to another processing unit when the progress data, for the processing unit originally assigned the particular region, indicates that progress of decoding its assigned regions is insufficient.

According to a ninth aspect, it is provided a computer program for decoding a video frame of a piece of video content. The computer program comprises computer program code which, when run on a decoder device causes the decoder device to: determine a set of non-overlapping regions of the video frame by reading metadata associated with the video frame; assign each region, in the set of regions, to a processing unit, wherein at least one processing unit is assigned a plurality of regions; decode, in each processing unit, picture data of its assigned region or regions; collect progress data from each processing unit, the progress data indicating progress of the decoding; and reassign a particular region for which decoding has not begun to another processing unit when the progress data, for the processing unit originally assigned the particular region, indicates that progress of decoding its assigned regions is insufficient.

According to a tenth aspect, it is provided a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 1 is a schematic diagram illustrating an environment in which embodiments presented herein can be applied;

FIG. 2 is a schematic diagram illustrating frames of an encoded video stream of FIG. 1 according to one embodiment;

FIG. 3 is a schematic diagram illustrating pixel blocks in a frame of FIG. 2 according to one embodiment;

FIG. 4 is a schematic diagram illustrating tiles in a frame of FIG. 2 according to one embodiment;

FIG. 5 is a schematic diagram illustrating slices in a frame of FIG. 2 according to one embodiment;

FIG. 6 is a schematic diagram illustrating a division of a frame of FIG. 2 in two regions with different encoding directions according to one embodiment;

FIG. 7A-B is a schematic diagram illustrating division of a region in two smaller regions according to one embodiment;

FIG. 8A-B is a schematic diagram illustrating combining two regions in a combined region according to one embodiment;

DETAILED DESCRIPTION

Figure 9A:
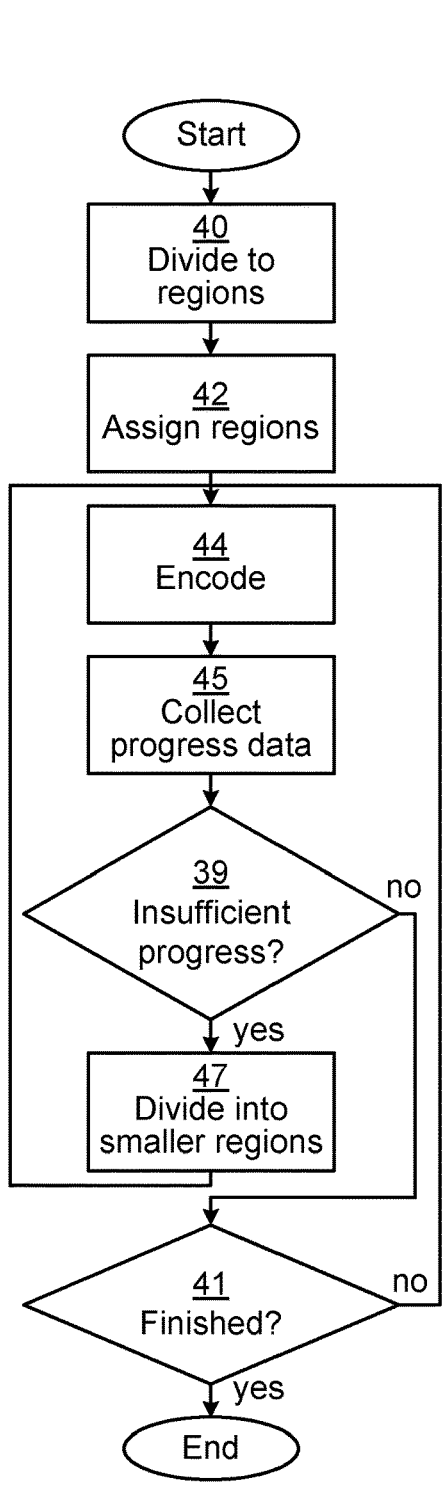
FIG. 9A-B are flow charts illustrating embodiments of methods for encoding video frames of a piece of video content.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 is a schematic diagram illustrating an environment in which embodiments presented herein can be applied. An encoder device 1 receives an input video stream 3 relating to a piece of video content. The input video stream 3 can be uncompressed video or it can be video encoded in a format which is not desired.

The encoder 1 then encodes the input video 3 and produces an encoded video stream 4. The encoder can encode in accordance with any suitable current or future video encoding standard, e.g. HEVC, H.263, H.264, MPEG (Moving Pictures Expert Group)-2, etc.

The encoded video stream 4 is distributed to the decoder 2 in some way. For example, the encoded video stream 4 can be streamed over a computer network (such as the Internet) via an intermediate streaming server (not shown) or the encoded video stream can be distributed using a physical storage medium such as a solid state memory (e.g. a universal serial bus drive) or an optical storage medium (such as an optical disc).

Regardless of the distribution mechanism, the decoder reads the encoded video stream 4 and decodes the encoded video stream 4 to be able to render the video such that a user can view the decoded video, e.g. on a display. The decoder can be provided using software and/or hardware and can be housed in a host device, e.g. a mobile phone, smart phone, tablet computer or general purpose computer.

FIG. 2 is a schematic diagram illustrating frames of an encoded video stream 4 of FIG. 1 according to one embodiment. The encoded video stream 4 comprises a number of sequential frames or pictures. There are a number of different frame types. In this example, there are three frame types: I-frames 5, P-frames 7 (only one shown here) and B-frames 6.

I-frames 5 are coded independently of all other frames. P-frames 7 comprise motion-compensated difference information in relation to at least one previous frame. B-frames 6 comprise motion-compensated difference information in relation to two (or more) frames.

FIG. 3 is a schematic diagram illustrating pixel blocks 20 in a frame 10 of FIG. 2 according to one embodiment. The frame 10 can be of any frame type, e.g. an I-frame 5, a P-frame 7 or a B-frame 6.

The frame is made up of pixels, where each pixel is a picture element of a particular colour. The pixels are grouped in pixel blocks. A pixel block is a square set of pixels, i.e. contains n by n pixels. In principle, each pixel block could also be a rectangle. In HEVC, pixel blocks can vary in size and can e.g. be 16×16, 32×32 or 64×64. Even though FIG. 3 shows pixel blocks 20 of equal size, each frame may contain pixel blocks of varying sizes.

FIG. 4 is a schematic diagram illustrating tiles 15a-b in a frame of FIG. 2 according to one embodiment. A tile is a rectangular set of pixel blocks in a video frame. Tiles of the same frame do not overlap. In the example of FIG. 4, the video frame 10 is made up of a first tile 15a and a second tile 15b, where the first tile 15a is larger than the second tile 15b. Hence, tiles can, but do not need to, vary in size within a video frame. Tiles do not need to have headers associated with them. In HEVC, the tile structure for a picture is defined among other parameters in a picture parameter set (PPS). The slice header defines which PPS to reference. The coded video data in a tile is part of the slice data.

FIG. 5 is a schematic diagram illustrating slices in a frame of FIG. 2 according to one embodiment. A slice is a set of consecutive pixel blocks. Slices of the same frame do not overlap. In the example of FIG. 4, the video frame 10 is made up of a first slice 16a and a second slice 16b, where the first slice 16a is larger than the second slice 16b. Hence, slices can, but do not need to, vary in size within a video frame. Slices can have headers associated with them. In HEVC, slice data always have a slice header.

Slices and tiles can be combined. For instance, a slice can comprise multiple tiles or a tile can comprise multiple slices. With conditions that all pixel blocks in a slice belong to the same tile and that all pixel blocks in a tile belong to the same slice.

FIG. 6 is a schematic diagram illustrating a division of a frame of FIG. 2 in two regions with different encoding directions according to one embodiment. The inventors have realised that adaptive use of regions within a frame allows dynamic adaptation to current conditions of complexity and capacity.

Looking to FIG. 6, there is a video frame which is divided into a first region 12a and a second region 12b. Each region can be a slice, a tile or some other subset of a frame. In any case, each region can be encoded or decoded by a separate processing unit, allowing parallelism in encoding and/or decoding.

As indicated by the arrows, in this example, the first region 12a is encoded and decoded in a first direction, from the beginning, i.e. the top left. Meanwhile, the second region 12b is encoded and decoded in a second direction, from the end, i.e. the bottom right. In encoding, this allows the sizes of the border between the two regions to be adjusted if the encoding of one region takes more time than expected.

FIG. 7A-B is a schematic diagram illustrating division of a region in two smaller regions according to one embodiment. In FIG. 7A, the video frame 10 is divided in a first region 12a and a second region 12b. Each region 12a-b is assigned to a separate processing unit for encoding. If progress data from the processing unit which encodes the second region 12b indicates that the encoding will not be finished by a specific time (described on more detail below), then the encoder device splits the second region 12b in two smaller regions 12b', 12b" as shown in FIG. 7B. Each one of the two smaller regions 12b', 12b" is then assigned to a separate processing unit.

In this way, the encoding is adapted by increasing parallelism when the encoding risks violating a time budget.

FIG. 8A-B is a schematic diagram illustrating combining two regions in a combined region according to one embodiment. In FIG. 8A, the video frame 10 is divided in a first region 12a, a second region 12b and a third region 12c. Each region 12a-c is assigned to a separate processing unit for encoding. If progress data from the processing unit encoding the second region 12b (or third region 12c) indicates that the processing unit is capable of encoding both the second region 12b and the third region 12c, then the encoder device combines the second region 12b and the third region in a combined region 12d as shown in FIG. 8B. The combined region 12d is then assigned to a single separate processing unit, i.e. the processing unit which indicated sufficient progress to be able to encode both the second and third regions 12b-c.

In this way, the encoding is adapted by decreasing parallelism when capacity allows this, thereby increasing encoding efficiency.

Figure 9B:
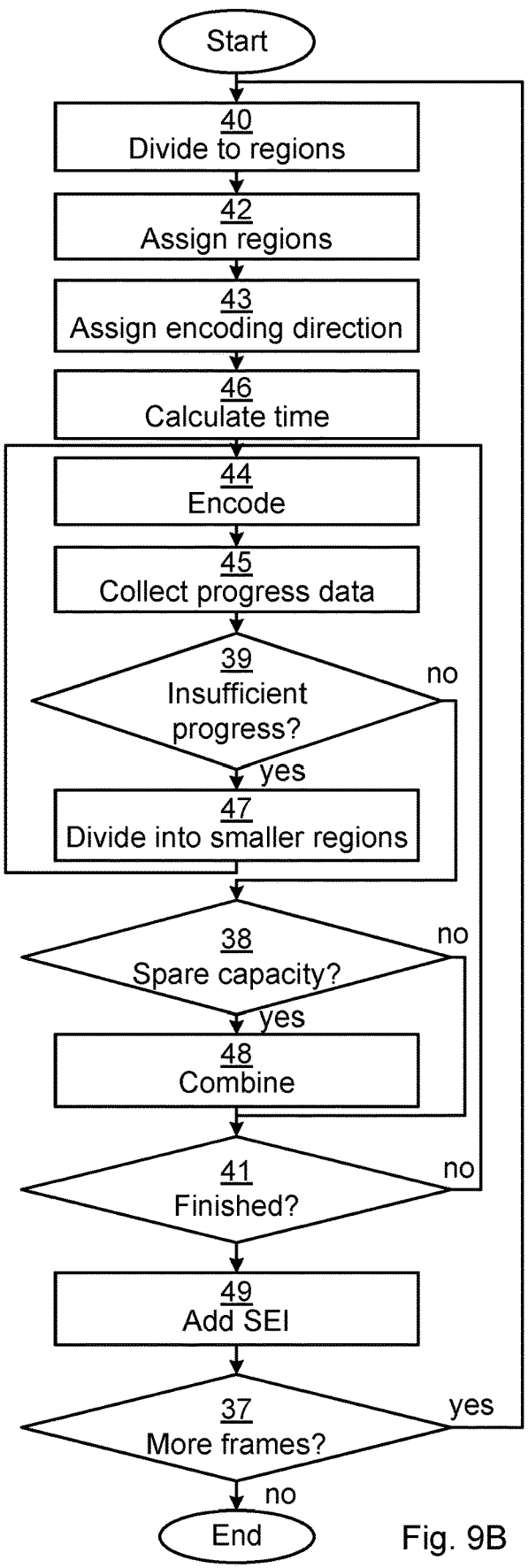

FIG. 9A-B are flow charts illustrating methods for encoding video frames of a piece of video content. The method can be performed in the encoder device 1 of FIG. 1. Using these methods, a dynamic, adaptive parallelism for encoding is achieved. It is to be noted that other types of parallelism for encoding can, but do not need to, be utilised. First, the method of FIG. 9A will be described.

In a divide to regions step 40, the video frame is divided into a set of non-overlapping regions (e.g. as shown in FIG. 6, 7A or 8A). The set comprises at least one region. In other words, the set can comprise one, two, or more regions. Optionally, this step comprises obtaining information regarding how a preceding video frame of the same frame type (e.g. I-frame, P-frame or B-frame) of the piece of video content was finally divided and dividing the video frame in the same way. This is a good starting point, as it is likely to be a decent division of the video frame.

As explained above, each region can be a tile, a slice or any other type of partitioning of the video frame. The division into regions may also be based on available resources, e.g. number of processing units, capacity of each processing unit, available memory, etc., and/or history of divisions for the same slice types (intra-slice, uni-predictive slice bi-predictive slice), video frame size, colour format, bit-depth and frame rate.

In an assign regions step 42, each region, in the set of regions, is assigned to a separate processing unit. This allows parallel processing in the encoding. This step also comprises communicating the assignment to the processing units in question, optionally including a time budget by when the encoding is to be finished.

In an encode step 44, picture data of the respective region is encoded. This is performed in parallel in the different processing units according to the assignment.

In a collect progress data step 45, progress data is collected from each one of the processing units. The progress data indicates progress of the encoding of the respective region. The progress data can include any one or more of the following: progress of the encoding, used capacity, available future capacity, quality of encoding, etc. The progress data can be sent at regular time intervals, after its region has ben encoded, or if the processing unit predicts it will exceed a given time budget given for encoding its region.

The progress data is communicated using inter processing unit communication, e.g. using shared memory and/or messages.

In a conditional insufficient progress step 39, it is determined whether the progress data indicates that progress of encoding any particular region is insufficient. If this is the case, the method proceeds to a divide into smaller regions step 47. Otherwise, the method proceeds to a conditional finished step 41. Insufficient progress can e.g. be when the progress data indicates that the encoding will not be finished by a specific time.

In the divide into smaller regions step 47, any particular region, for which progress is insufficient, is divided into a plurality of smaller regions. Each of the smaller regions is assigned to a separate processing unit. Optionally, this division into smaller regions is based on known capacity of the available processing units. If no more processing units are available, encoding speed can be increased, e.g. by reducing the coding mode search space for the encoding of the region which shows insufficient progress.

In the conditional finished step 41, it is determined whether the video frame is completely encoded or not. If this is the case, the method ends. Otherwise, the method returns to the encode step 44. It is to be noted that this step can be performed as a polling step or using push messaging from each of the processing units when they are finished with their respective encoding task.

The resulting bitstream of encoded video stream comprises information regarding the regions (e.g. tiles and/or slices), allowing the decoder to parallelise the decoding.

Using this method, the video frame is divided into smaller regions only when the progress data indicates that this is necessary in order to be done by a specific time. In this way, the number of regions in the video frame is adapted according to complexity of encoding and processing power.

Looking now to FIG. 9B, only new or modified steps compared to the method illustrated by the flow chart of FIG. 9A will be described.

In an optional assign encoding direction step 43, an encoding direction is assigned for each processing unit. The encoding direction can be either starting from the beginning or starting from the end, as illustrated in FIG. 6 and shown above. In this way, the border between two adjacent regions can be dynamically determined depending on encoding progress for the two regions.

In an optional calculate time step 46, the specific time is calculated by deducting a margin time from a deadline time. For instance, a budget of 100 microseconds could be assigned for encoding a video frame, giving a deadline time of 100 microseconds from a current time. The margin time could then e.g. be 10 microseconds, whereby the specific time is calculated to be 90 (100–10) microseconds from now. This reduces the risk of the encoding for the video frame exceeding the deadline time if actual encoding takes slightly longer than expected.

In an optional conditional spare capacity step 38, it is determined whether the progress data indicates that a specific processing unit has spare capacity. Spare capacity can for instance be when the progress data for the specific processing unit indicates that it is capable of encoding a combined region, encompassing a plurality of (i.e. at least two) regions before combining, by a specific time. The specific processing unit is one of the processing units associated with the plurality of regions. In other words, one region of the plurality of regions is assigned to the specific processing unit. If spare capacity exists, the method proceeds to a combine step 48. Otherwise, the method proceeds to the conditional finished step 41.

In the optional combine step 48, a plurality of regions are combined in a combined region. The combined region is assigning to the specific processing unit. In this way, the number of regions are reduced when there is spare capacity to handle larger regions. This reduces parallelism when possible, thereby improving encoding efficiency, processing unit usage and power usage.

In an optional add SEI (Supplementary Enhancement Information) step 49, supplementary enhancement information is added in association with the video frame. The supplementary enhancement information comprises decoding complexity data for each region of the video frame. For instance, the decoding complexity data can include an absolute number related to the number of processor operations, decoding time, decoding level, etc. Alternatively or additionally, the decoding complexity data can include a relative number indicating if the complexity has increased/decreased/is similar compared to a previous frame. Since the decoder will know, based on experience, how long it takes to decode a frame, the SEI can indicate if that assumption is valid. The decoding complexity data could relate to the whole video frame and/or each region within the video frame.

In an optional conditional more frames step 37, it is determined whether there are any more frames to encode. If this is the case, the method returns to the divide to regions step 40. Otherwise, the method ends.

An example will now be described to illustrate embodiments presented herein further.

In this example, eight cores (i.e. processing units) are available and the video frame consists of 100 rows (rows of CTUs (Coding Tree Units) in HEVC terms) and shall be encoded within a time budget of 100 microseconds. One of the core or another CPU has the main control task to schedule the encoding to meet the time budget using the available cores. If no timing info from a previous coded video frame of the same type and quantization parameter or bitrate as the video frame to be encoded is known, it is assumed that the main control can divide the video frame in as many tiles/slices as is expected given the video frame size and the time budget. Otherwise the main control assumes that same amount of tiles/slices as in previous coded video frame shall be used. The previous coded video frame is preferably of the same slice type as the current video frame. In the example the main control expects two cores to be enough and thus divides the video frame (step 40) in two regions and assigns the regions (step 42) to two cores, giving each core a time budget of 90 microseconds to finish, having a marginal of 10 microseconds (step 46). One region is assigned to encode top-down and the other region is assigned to encode bottom-up (step 43).

One of the cores, core A, starts from the top, and encodes (step 44) row-wise downwards and the other core, core B, starts at the bottom and encodes (step 44) row-wise upwards. After encoding each row, each core reports the time to the main control (step 45) which compares the time for encoding the row with a time budget available for each row. The main control estimates based on the progress of the cores if they will be able to finish encoding the video frame in time (step 39). The status at some point in time can be that core A has encoded 10 of 100 rows in 20 microseconds. The main control then assumes that core A can encode 35 additional rows given the time budget (assuming constant time for remaining rows). Core B has managed to encode 15 rows in 20 microseconds. The main control then assumes that core B will manage to encode 45 additional rows (53 additional rows if the average time for remaining rows is same as the average time for current rows).

The main control does not consider that it is needed to include additional cores for the encoding since it expects the cores to finish within the time budget with a 10% margin.

The main control sends updated info to the cores about expected number of rows they should encode, to core A that it can continue until it has encoded a total of 45 rows and to core B that it can continue encoding a total of 55 rows. If this holds until the video frame is encoded (step 41) it will be encoded in 90 microseconds using 2 cores where the video frame was split into two tiles or slices where the top region corresponds to 45 rows and the bottom region corresponds to 55 rows.

The main control might also decide to combine two regions because the time budget can be met with one region or because of a reduced number of available cores, allowing some cores to be used for other processes (steps 38 and 48). In another embodiment, the encoding direction is always fixed (for example row-wise downwards as for HEVC). One core is given a time budget to encode a certain region. After encoding each row it reports the progress to a main control. If the main control at some point discovers that the core will not meet the time budget given that encoding continues at the same speed for the rest of the region (step 39) it divides the region into two smaller regions (step 47) at a position where it is estimated that the first core can encode within the time budget with some margin, and assigns the smaller region being second part of the region to another core. The main control makes the first core aware that it now has a reduced region to encode. If the main controller at any point thinks that one of the currently running cores not will meet the time budget (step 39) it divides that region further (step 47) according to same principle.

Figure 10A:
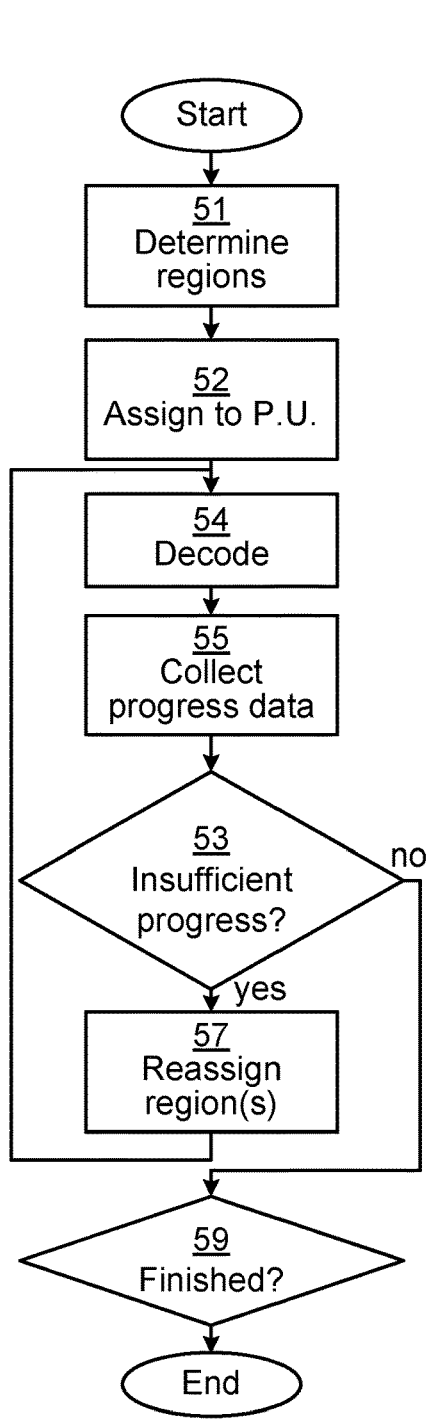
FIG. 10A-B are flow charts illustrating embodiments of methods for decoding video frames of a piece of video content.
Figure 10B:
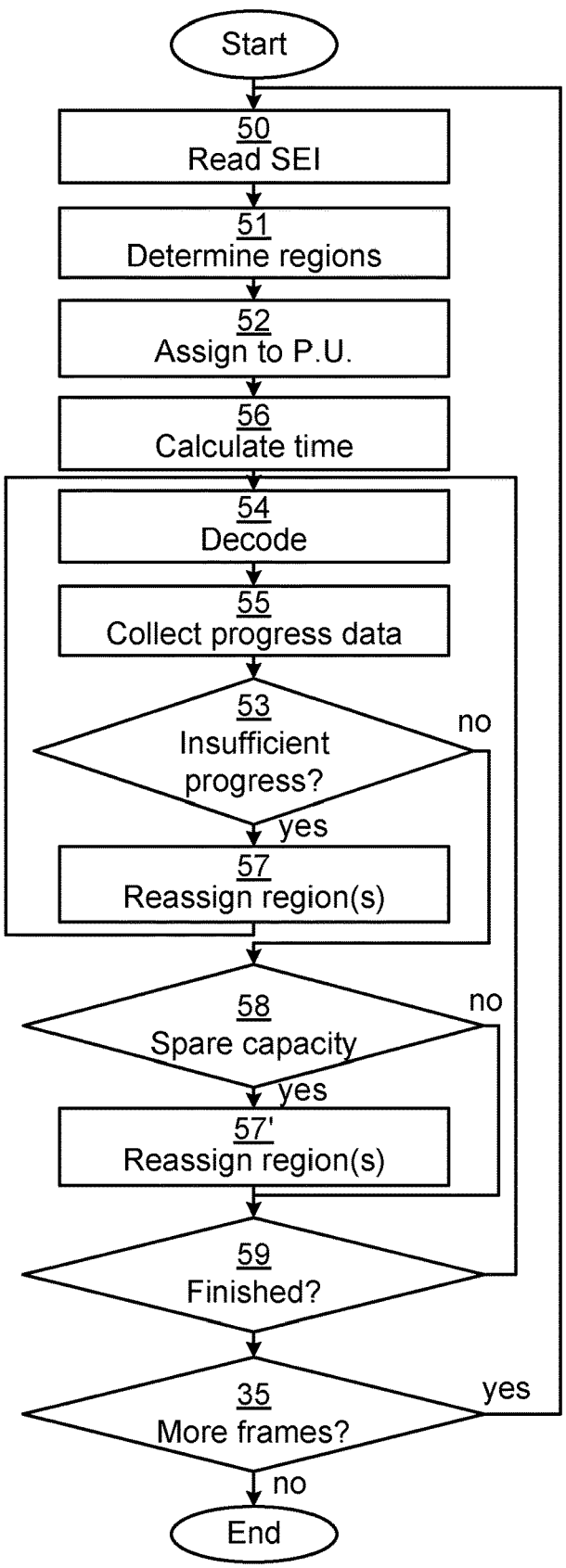

FIG. 10A-B are flow charts illustrating methods for decoding video frames of a piece of video content. The method can be performed in the decoder device 2 of FIG. 1. Using these methods, a dynamic, adaptive parallelism for decoding is achieved. It is to be noted that other types of parallelism for decoding can, but do not need to, be utilised. First, the method of FIG. 10A will be described.

In a determine regions step 51, a set of non-overlapping regions of the video frame are determined by reading metadata associated with the video frame. The metadata is data about the video contained in the encoded video stream. This metadata provides information to the decoder how to decode the encoded video stream, e.g. data about the regions and optionally directionality of the regions.

In an assign to P.U. (processing units) step 52, each region, in the set of regions, is assigned to a processing unit. In this case, at least one processing unit is assigned a plurality of regions. Optionally, this step comprises obtaining information regarding how a preceding video frame of the same frame type (e.g. I-frame, P-frame or B-frame) of the piece of video content was finally assigned and assigning the video frame in the same way.

In a decode step 54, picture data of its assigned region or regions is decoded in each processing unit. If directional data is included, the decoding is performed in accordance with the directional data, see e.g. FIG. 6 and corresponding description above.

In a collect progress data step 55, progress data is collected from each processing unit. The progress data indicates progress of the decoding.

In a conditional insufficient progress step 53, it is determined whether the progress data, for a processing unit originally assigned a particular region for which decoding has not begun, indicates that progress of decoding its assigned regions is insufficient. For instance, insufficient progress can be when the progress data indicates that the decoding will not be finished by a specific time. If progress is insufficient, the method proceeds to a reassign region(s) step 57. Otherwise, the method proceeds to a conditional finished step 59.

In the reassign regions(s) step 57, the particular region for which decoding has not begun is reassigned to another processing unit. Optionally, this comprises reassigning a plurality of regions.

In the conditional finished step 59, it is determined whether the video frame is completely decoded or not. If this is the case, the method ends. Otherwise, the method returns to the decode step 54.

Looking now to FIG. 10B, only new or modified steps compared to the method illustrated by the flow chart of FIG. 10A will be described.

In an optional read SEI step 50, supplementary enhancement information is read in association with the video frame. As explained above, the supplementary enhancement information comprises decoding complexity data for each region of the video frame. In such a case, the assign to P.U. step 52 comprises assigning each region based on the supplementary enhancement information.

In an optional calculate time step 56, the specific time is calculated by deducting a margin time from a deadline time.

In an optional conditional spare capacity step 58, it is determined whether the progress data indicates that a combined processing unit has spare capacity. Spare capacity can for instance be when the progress data for the combined processing unit indicates that it is capable of decoding more than its originally assigned region(s) by the specific time. If spare capacity exists, the method proceeds to a reassign region(s) step 57'. Otherwise, the method proceeds to the conditional finished step 59.

In the optional reassign region(s) step 57', the regions are reassigned such that the processing unit with the spare capacity is assigned one or more additional regions. This relieves another processing unit of having to perform the decoding for the reassigned region(s).

In an optional conditional more frames step 35, it is determined whether there are any more frames to decode. If this is the case, the method returns to the read SEI step 50 (or determine regions step 51, when the read SEI step 50 is not executed). Otherwise, the method ends.

Figure 11:
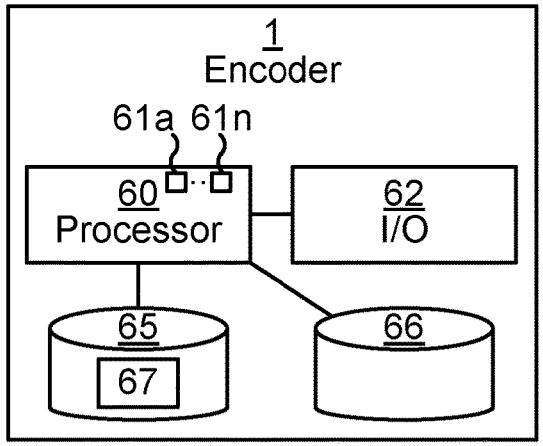
FIG. 11 is a schematic diagram showing some components of the encoder device of FIG. 1 according to one embodiment.

FIG. 11 is a schematic diagram showing some components of the encoder device 1 of FIG. 1 according to one embodiment. A processor 60 is provided using any combination of one or more of a suitable central processing unit (CPU), multiprocessor, graphics processing unit (GPU), microcontroller, digital signal processor (DSP), application specific integrated circuit etc., capable of executing software instructions 67 stored in a memory 65, which can thus be a computer program product. The processor 60 comprises a plurality of processing units 61*a-n*. For instance, the processing units 61*a-n* can be different processor cores of a CPU or GPU, and/or separate CPUs or GPUs. As described above, different regions of a frame can be assigned to different processing units for encoding. It is to be noted that it is also possible that one or more processing units are located externally to the processor 60. The processor 60 can be configured to execute the method described with reference to FIGS. 9A-B above.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The encoder device 1 further comprises an I/O interface 62 for communicating with other external entities. Optionally, the I/O interface 62 also includes a user interface.

Other components of the encoder device 1 are omitted in order not to obscure the concepts presented herein.

Figure 12:
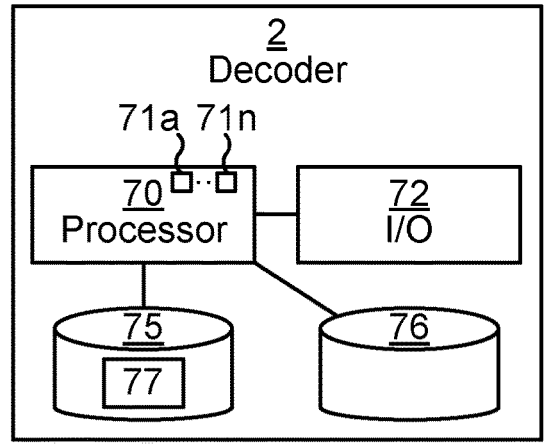
FIG. 12 is a schematic diagram showing some components of the decoder device of FIG. 1 according to one embodiment.

FIG. 12 is a schematic diagram showing some components of the decoder device 2 of FIG. 1 according to one embodiment. A processor 70 is provided using any combination of one or more of a suitable central processing unit (CPU), multiprocessor, graphics processing unit (GPU), microcontroller, digital signal processor (DSP), application specific integrated circuit etc., capable of executing software instructions 77 stored in a memory 75, which can thus be a computer program product. The processor 70 comprises a plurality of processing units 71a-n. For instance, the processing units 71a-n can be different processor cores of a CPU or GPU, and/or separate CPUs or GPUs. As described above, different regions of a frame can be assigned to different processing units for decoding. It is to be noted that it is also possible that one or more processing units are located externally to the processor 70. The processor 70 can be configured to execute the method described with reference to FIGS. 9A-B above.

The memory 75 can be any combination of read and write memory (RAM) and read only memory (ROM). The memory 75 also comprises persistent storage, which, for example, can be any single one or combination of magnetic memory, optical memory, solid state memory or even remotely mounted memory.

A data memory 76 is also provided for reading and/or storing data during execution of software instructions in the processor 70. The data memory 76 can be any combination of read and write memory (RAM) and read only memory (ROM).

The decoder device 2 further comprises an I/O interface 72 for communicating with other external entities. Optionally, the I/O interface 72 also includes a user interface.

Other components of the decoder device 2 are omitted in order not to obscure the concepts presented herein.

As explained above, the decoder 2 can form part of a host device, in which case some or all of the components can be part of the host device, but used as described herein.

Figure 13:
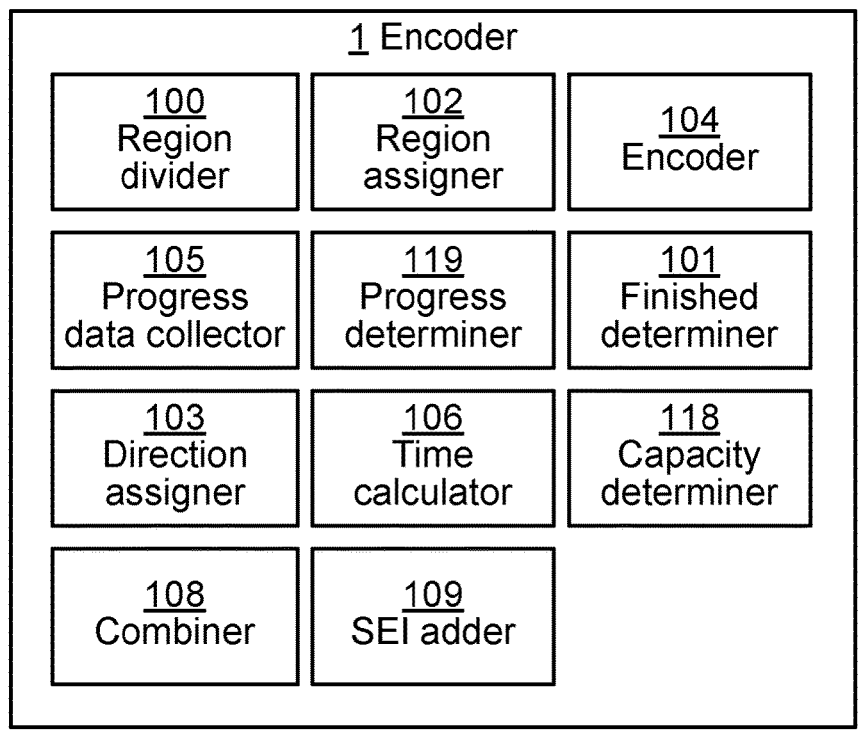
FIG. 13 is a schematic diagram showing functional modules in the encoder device of FIG. 11 according to one embodiment.

FIG. 13 is a schematic diagram showing functional modules in the encoder device 1 of FIG. 11 according to one embodiment. The modules can be implemented using software instructions such as a computer program executing in the encoder device 1 and/or using hardware, such as application specific integrated circuits, field programmable gate arrays, discrete logical components, etc. The modules correspond to the steps in the methods illustrated in FIGS. 9A-B.

A region divider 100 is arranged to divide the video frame into a set of non-overlapping regions and to divide, when needed, a particular region into a plurality of smaller regions. This module corresponds to the divide to regions step 40 and the divide into smaller regions step 47 of FIGS. 9A-B.

A region assigner 102 is arranged to assign each region to a separate processing unit. This module corresponds to the assign regions step 42 of FIGS. 9A-B.

An encoder 104 is arranged to encode, in each processing unit, picture data of the respective region. This module corresponds to the encode step 44 of FIGS. 9A-B.

A progress data collector 105 is arranged to collect progress data from each processing unit, where the progress data indicates progress of the encoding of the respective region. This module corresponds to the collect progress data step 45 of FIGS. 9A-B.

A progress determiner 119 is arranged to determine when the progress data indicates that progress of encoding the particular region is insufficient. This module corresponds to the conditional insufficient progress step 39 of FIGS. 9A-B.

A finished determiner 101 is arranged to determine whether the video frame is completely encoded or not. This module corresponds to the conditional finished step 41 of FIGS. 9A-B.

A direction assigner 103 is arranged to assign an encoding direction for each processing unit. This module corresponds to the assign encoding direction step 43 of FIG. 9B.

A time calculator 106 is arranged to calculate the specific time by deducting a margin time from a deadline time. This module corresponds to the calculate time step 46 of FIG. 9B.

A capacity determiner 118 is arranged to determine when the progress data indicates that the combined processing unit has spare capacity. This module corresponds to the conditional spare capacity step 38 of FIG. 9B.

A combiner 108 is arranged to combine a plurality of regions in a combined region and assigning the combined region to a combined processing unit.

This module corresponds to the combine step 48 of FIG. 9B.

An SEI adder 109 is arranged to add supplementary enhancement information in association with the video frame. This module corresponds to the add SEI step 49 of FIG. 9B.

Figure 14:
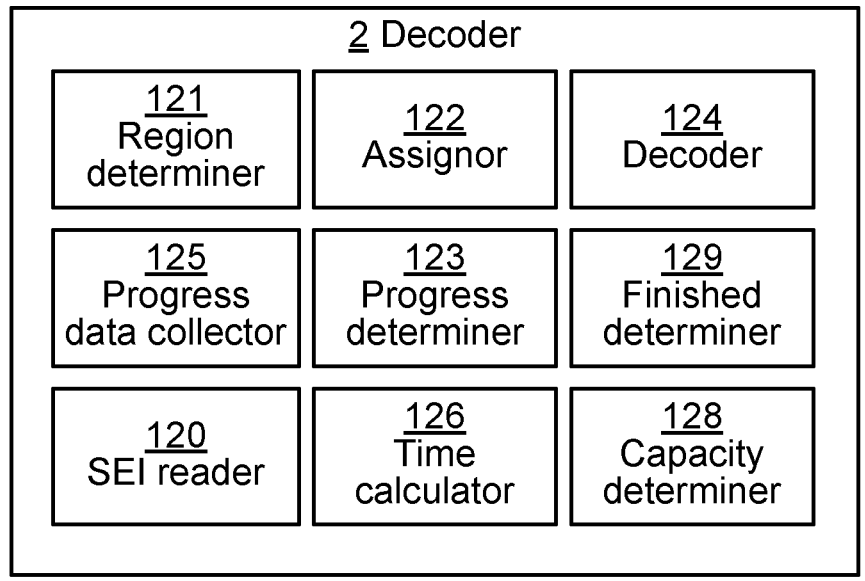
FIG. 14 is a schematic diagram showing functional modules in the decoder device 2 of FIG. 12 according to one embodiment.

FIG. 14 is a schematic diagram showing functional modules in the decoder device 2 of FIG. 12 according to one embodiment. The modules can be implemented using software instructions such as a computer program executing in the decoder device 2 and/or using hardware, such as application specific integrated circuits, field programmable gate arrays, discrete logical components, etc. The modules correspond to the steps in the methods illustrated in FIGS. 10A-B.

A region determiner 121 is arranged to determine a set of non-overlapping regions of the video frame by reading metadata associated with the video frame. This module corresponds to the determine regions step 51 of FIGS. 10A-B.

An assignor 122 is arranged to assign each region to a processing unit, wherein at least one processing unit is assigned a plurality of regions. This module corresponds to the assign to P.U. step 52 of FIGS. 10A-B and the reassign region(s) step 57' of FIG. 10B.

A decoder 124 is arranged to decode, in each processing unit, picture data of its assigned region or regions. This module corresponds to the decode step 54 of FIGS. 10A-B.

A progress data collector 125 is arranged to collect progress data from each processing unit. The progress data indicates progress of the decoding. This module corresponds to the collect progress data step 55 of FIGS. 10A-B.

A progress determiner 123 is arranged to determine when progress data, for a processing unit originally assigned a particular region, indicates that progress of decoding its assigned regions is insufficient. This module corresponds to the conditional insufficient progress step 53 of FIGS. 10A-B.

A finished determiner 129 is arranged to determine whether the video frame is completely decoded or not. This module corresponds to the conditional finished step 59 of FIGS. 10A-B.

An SEI reader 120 is arranged to read supplementary enhancement information in association with the video frame. This module corresponds to the read SEI step 50 of FIG. 10B.

A time calculator 126 is arranged to calculate the specific time by deducting a margin time from a deadline time. This module corresponds to the calculate time step 56 of FIG. 10B.

A capacity determiner 128 is arranged to determine whether the progress data indicates that a combined processing unit has spare capacity. This module corresponds to the conditional spare capacity step 58 of FIG. 10B.

Figure 15:
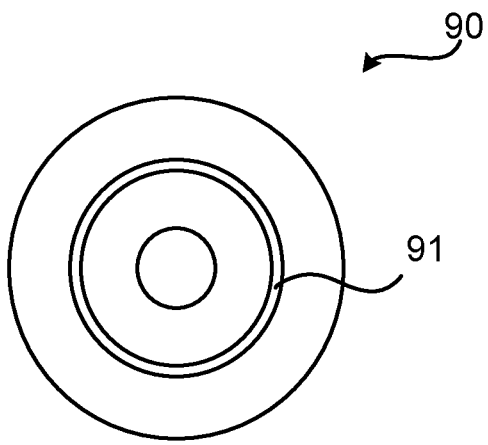
FIG. 15 shows one example of a computer program product comprising computer readable means according to one embodiment.

FIG. 15 shows one example of a computer program product 90 comprising computer readable means according to one embodiment. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program products 65 of FIG. 11 or 75 of FIG. 12. While the computer program 91 is here schematically shown as a track on the depicted optical disk, the computer program can be stored in any way which is suitable for the computer program product, such as a removable solid state memory (e.g. a universal serial bus memory).

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for encoding a video frame of a piece of video content, the method comprising an encoder device:
    dividing the video frame into a set of non-overlapping regions, wherein the set comprises at least one region;
    assigning each region, in the set of regions, to a separate processing unit;
    encoding, in each processing unit, picture data of the respective region;
    collecting progress data from each processing unit, the progress data indicating progress of the encoding of the respective region; and
    in response to the progress data indicating a prediction that encoding a particular region will exceed a predetermined time budget for the particular region, dividing the particular region into a plurality of smaller regions and assigning each smaller region to a separate processing unit.

2. The method of claim 1, further comprising, in response to the progress data indicating that a specific processing unit has spare capacity, combining a plurality of regions in a combined region and assigning the combined region to the specific processing unit, the specific processing unit being one of the processing units associated with the plurality of regions.

3. The method of claim 2, wherein spare capacity is when the progress data for the specific processing unit indicates that it is capable of encoding the combined region by a specific time.

4. The method of claim 1, further comprising assigning an encoding direction for each processing unit, the encoding direction being either starting from a beginning or starting from an end.

5. The method of claim 1, wherein in the dividing the video frame, each region is a rectangular tile of pixel blocks, wherein each pixel block is a square of pixels.

6. The method of claim 1, wherein in the dividing the video frame, each region is a slice of consecutive pixel blocks, wherein each pixel block is a square of pixels.

7. The method of claim 1, further comprising calculating a specific time in which to finish encoding the particular region by deducting a margin time from a deadline time.

8. The method of claim 1, further comprising adding supplementary enhancement information in association with the video frame, the supplementary enhancement information comprising decoding complexity data for each region of the video frame.

9. The method of claim 1, wherein the dividing the video frame comprises obtaining information regarding how a preceding video frame of a same frame type of the piece of video content was finally divided and dividing the video frame in the same way.

10. An encoder device for encoding a video frame of a piece of video content, the encoder device comprising:
    processing circuitry; and
    a memory storing instructions executable by the processing circuitry whereby the encoder device is operable to:
        divide the video frame into a set of non-overlapping regions, wherein the set comprises at least one region;
        assign each region, in the set of regions, to a separate processing unit;
        encode, in each processing unit, picture data of the respective region;
        collect progress data from each processing unit, the progress data indicating progress of the encoding of the respective region; and
        in response to the progress data indicating a prediction by a processing unit that encoding a particular region will exceed a predetermined time budget for the particular region, divide the particular region into a plurality of smaller regions and assign each smaller region to a separate processing unit.

11. The encoder device of claim 10, wherein the instructions are such the encoder device is operable to, in response to the progress data indicating that a specific processing unit has spare capacity, combine a plurality of regions in a combined region and assign the combined region to the specific processing unit, the specific processing unit being one of the processing units associated with the plurality of regions.

12. The encoder device of claim 10, assign an encoding direction for each processing unit, the encoding direction being either starting from a beginning or starting from an end.

13. The encoder device of claim 10, wherein the instructions are such the encoder device is operable to add supplementary enhancement information in association with the video frame, the supplementary enhancement information comprising decoding complexity data for each region of the video frame.

14. The encoder device of claim 10, wherein the instructions are such the encoder device is operable to divide the video frame by obtaining information regarding how a preceding video frame of a same frame type of the piece of video content was finally divided and dividing the video frame in the same way.

15. The encoder device of claim 10, wherein each processing unit is a processor core.

16. A non-transitory computer readable recording medium storing a computer program product for encoding a video frame of a piece of video content, the computer program product comprising software instructions which, when run on processing circuitry of the encoding device, causes the encoding device to:
- divide the video frame into a set of non-overlapping regions comprising at least one region;
- assign each region, in the set of regions, to a separate processing unit;
- encode, in each processing unit, picture data of the respective region;
- collect progress data from each processing unit, the progress data indicating progress of the encoding of the respective region; and
- in response to the progress data indicating a prediction that encoding a particular region will exceed a predetermined time budget for the particular region, divide the particular region into a plurality of smaller regions and assign each smaller region to a separate processing unit.

17. A method for decoding a video frame of a piece of video content, the method comprising a decoder device:
- determining a set of non-overlapping regions of the video frame by reading metadata associated with the video frame;
- assigning each region, in the set of regions, to a processing unit, wherein at least one processing unit is assigned a plurality of regions;
- decoding, in each processing unit, picture data of its assigned region or regions;
- collecting progress data from each processing unit, the progress data indicating progress of the decoding; and
- in response to the progress data, for a processing unit originally assigned a particular region, indicating a prediction that progress of decoding its assigned regions will exceed a predetermined time budget, reassigning the particular region for which decoding has not begun to another processing unit.

18. The method of claim 17, further comprising calculating a specific time in which to finish decoding the particular region by deducting a margin time from a deadline time.

19. The method according to claim 17:
- further comprising reading supplementary enhancement information in association with the video frame, the supplementary enhancement information comprising decoding complexity data for each region of the video frame;
- wherein the assigning each region comprises assigning each region based on the supplementary enhancement information.

20. The method of claim 17, wherein in the determining a set of non-overlapping regions, each region is a rectangular tile of pixel blocks, wherein each pixel block is a square of pixels.

21. The method of claim 17, wherein in the determining a set of non-overlapping regions, each region is a slice of consecutive pixel blocks, wherein each pixel block is a square of pixels.

22. The method of claim 17, wherein the assigning each region comprises obtaining information regarding how a preceding video frame of the same frame type of the piece of video content was finally assigned, and assigning the video frame in the same way.

23. A decoder device for decoding a video frame of a piece of video content, the decoder device comprising:
- processing circuitry; and
- a memory storing instructions executable by the processing circuitry whereby the decoder device is operable to:
  - determine a set of non-overlapping regions of the video frame by reading metadata associated with the video frame;
  - assign each region, in the set of regions, to a processing unit, wherein at least one processing unit is assigned a plurality of regions;
  - decode, in each processing unit, picture data of its assigned region or regions;
  - collect progress data from each processing unit, the progress data indicating progress of the decoding; and
  - in response to the progress data, for a processing unit originally assigned a particular region, indicating a prediction that progress of decoding its assigned regions will exceed a predetermined time budget, reassign the particular region for which decoding has not begun to another processing unit.

24. The decoder device of claim 23, wherein the instructions are such the decoder device is operable to:
- read supplementary enhancement information in association with the video frame, the supplementary enhancement information comprising decoding complexity data for each region of the video frame; and
- assign each region based on the supplementary enhancement information.

25. The decoder device of claim 23, wherein the instructions are such the decoder device is operable to assign each region by obtaining information regarding how a preceding video frame of the same frame type of the piece of video content was finally assigned, and assigning the video frame in the same way.

26. A non-transitory computer readable recording medium storing a computer program product for decoding a video frame of a piece of video content, the computer program product comprising software instructions which, when run on processing circuitry of a decoder device, causes the decoder device to:
- determine a set of non-overlapping regions of the video frame by reading metadata associated with the video frame;
- assign each region, in the set of regions, to a processing unit, wherein at least one processing unit is assigned a plurality of regions;
- decode, in each processing unit, picture data of its assigned region or regions;
- collect progress data from each processing unit, the progress data indicating progress of the decoding; and
- in response to the progress data, for a processing unit originally assigned a particular region, indicating a prediction that progress of decoding its assigned regions will exceed a predetermined time budget, reassign the particular region for which decoding has not begun to another processing unit.

* * * * *